United States Patent [19]

Kozaki et al.

[11] Patent Number: 5,099,345
[45] Date of Patent: Mar. 24, 1992

[54] COLORED LIQUID-CRYSTAL DISPLAY DEVICE HAVING SUPERTWISTED NEMATIC LIQUID CRYSTAL AND COLOR FILTERS

[75] Inventors: Shuichi Kozaki, Nara; Yukiko Ichimura, Tenri; Yozo Narutaki, Nara, all of Japan

[73] Assignee: Sharp Kabushiki Kaisha, Osaka, Japan

[21] Appl. No.: 647,169

[22] Filed: Jan. 24, 1991

Related U.S. Application Data

[63] Continuation of Ser. No. 440,468, Nov. 20, 1989, abandoned, which is a continuation of Ser. No. 166,136, Mar. 10, 1988, abandoned.

[30] Foreign Application Priority Data

Mar. 10, 1987 [JP] Japan ................... 62-54397

[51] Int. Cl.$^5$ .............................................. G02F 1/133
[52] U.S. Cl. ........................... 359/93; 359/63; 359/68; 359/78; 359/106
[58] Field of Search ............... 350/346, 347 E, 347 R, 350/339 F, 340, 341, 337 R, 350 R; 340/784, 765

[56] References Cited

U.S. PATENT DOCUMENTS

| | | | |
|---|---|---|---|
| 4,443,065 | 4/1984 | Funada et al. | 350/347 E |
| 4,552,436 | 11/1985 | Kozaki et al. | 350/337 |
| 4,579,425 | 1/1986 | Ishii et al. | 350/346 |
| 4,593,977 | 6/1986 | Takamatsu et al. | 350/339 F |
| 4,600,274 | 7/1986 | Mozozumi | 350/339 F |
| 4,693,562 | 9/1987 | Hasegawa et al. | 350/346 |
| 4,697,884 | 10/1987 | Amstutz et al. | 350/346 |
| 4,773,737 | 9/1988 | Yokono et al. | 350/339 F |
| 4,844,569 | 7/1989 | Wada et al. | 350/347 E |
| 4,856,875 | 8/1989 | Kozaki et al. | 350/341 |
| 4,896,947 | 1/1990 | Leonhouts | 350/346 |
| 5,004,324 | 4/1991 | Leonhouts et al. | 350/347 R |

FOREIGN PATENT DOCUMENTS 10260450 3/1988 European Pat. Off.
12154016 8/1985 United Kingdom.
1217242 9/1986 United Kingdom.

OTHER PUBLICATIONS

SID 1985 Digest of Technical Papers, 1,2 1st edition, May 1985, New York, T. J. Scheffer, et al., pp. 120-123.
M. Schadt et al., Appl. Phys. Lett., vol. 50, No. 5, Feb. 2, 1987, pp. 236-238.
T. J. Scheffer et al., Appl. Phys. Lett., vol. 45, No. 10, Nov. 15, 1984, pp. 1021-1023.

*Primary Examiner*—Stanley D. Miller
*Assistant Examiner*—Tai V. Duong
*Attorney, Agent, or Firm*—Morrison & Foerster

[57] ABSTRACT

A colored liquid-crystal display device comprising a positive dielectric anisotropy nematic liquid-crystal layer with the dielectric constant anisotropy, the liquid-crystal layer having an optically active substance; a pair of electrode substrates facing each other and sandwiching therebetween the positive dielectric anisotropy nematic liquid-crystal layer in such a manner that the positive dielectric anisotropy nematic liquid-crystal is formed into a twisted structure with a fixed angle of twist of the liquid-crystal molecules, $\phi$, of the positive dielectric anisotropy nematic liquid-crystal layer in the direction of a thickness d of the positive dielectric anisotropy nematic liquid-crystal layer; and a polarizer and a analyzer positioned outside of the pair of electrode substrates, respectively, wherein the twist angle $\phi$ is set to be in the range of 180° to 300° and the product of the refractivity anisotropy $\Delta n$ of the positive dielectric anisotropy nematic liquid-crystal and the thickness d of the positive dielectric anisotropy nematic liquid-crystal, $\Delta n \cdot d$, is set to be in the range of 0.3 $\mu$m to 0.7 $\mu$m.

3 Claims, 6 Drawing Sheets

COLORED LIQUID-CRYSTAL DISPLAY DEVICE HAVING SUPERTWISTED NEMATIC LIQUID CRYSTAL AND COLOR FILTERS

This application is a continuation of application Ser. No. 07/440,468, filed Nov. 20, 1989, now abandoned, which is a continuation of application Ser. No. 07/166,136, filed Mar. 10, 1988, now abandoned.

BACKGROUND OF THE INVENTION

1. Field of the Invention

This invention relates to a colored liquid-crystal display device of the twisted positive dielectric anisotropy nematic type with improved multiplex drive characteristics.

2. Description of the Prior Art

In recent years, interest in twisted positive dielectric anisotropy nematic colored liquid-crystal display devices of the permeable type with color filters and color polarizing plates for use as colored display devices has increased. In particular, to produce liquid-crystal color television with the use of such a display process, research has been active in driving methods, the structure of color filters, liquid-crystal materials, and the like. In this display process, with a liquid-crystal panel with many display picture elements, the two major items that must be achieved are high purity of the color and wide color phase of the color.

As the drive methods for liquid-crystal devices (LCD), there are the pure multiplex drive method and the active matrix drive method; from the standpoints of cost and effective display surface area, the former method is preferable.

Figure 7:
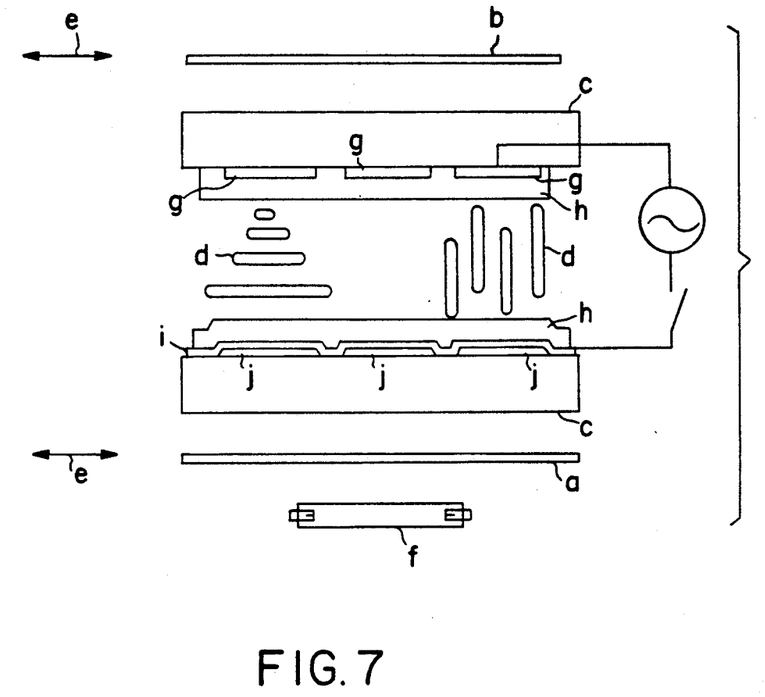
FIG. 7 is a sectional view showing a conventional twisted positive dielectric anistropy nematic-type colored liquid-crystal display device.

Below, the basic principles of a conventional twisted positive dielectric anisotropy nematic-type colored liquid-crystal display device (a color display TN-LCD) with the pure multiplex drive method will be explained with reference to FIG. 7, wherein the reference letter a is the polarizer, b is the analyzer, c is the glass base, d is the molecules of liquid crystals, e is the direction of the axis of polarization, f is the light source, g is the display electrodes (signal electrode and scanning electrode), h is the molecular orientation membrane, i is the common electrode, and j is the color filter layer.

In this way, in an X-Y matrix-type LCD in which there is a combination of a signal electrode (X electrode) and a scanning electrode (Y electrode) that are at right angles to each other, color filter layers j that are red (R), green (G), and blue (B) are formed on the inner side (liquid-crystal side) or the outer side of the glass base c corresponding to the display picture elements, resulting in a twisted positive dielectric anisotropy nematic construction for the liquid-crystal layer, the angle of twist of which is about 90° C. The LCD is used as the light shutter elements. Also, as the polarizing layer (polarizer a and analyzer b), a color polarizing plate with a mosaic-like array of R, G, and B can be used as a full-color display device.

In the drive method, the Y electrode scans along virtual lines, and applies voltage waves that correspond to the selective and non-selective picture elements. As a result, selective picture elements receive effective voltage that is higher than the non-selective picture elements, and at the selective picture elements, the TN-LCD becomes "on" and light of wavelengths corresponding to R, G, and B permeates through. At the non-selective picture elements, when the effective voltage, $V_{ns}$, applied to the non-selective picture elements is the threshold value for voltage for the TN-LCD or less, the passage of light through these picture elements is prevented because of the light shutter effect. When the picture elements are small enough compared to the clearly visible distance, the light that passes through the selective picture elements can be recognized as mixed light (full color display). Also, when to the full color display function, the voltage pulse is modulated and an intermediate modulation display function arising from the modulation of the voltage pulse width is added, it is possible to create a color liquid-crystal television.

With the optimized pure-multiplex drive method, the voltage applied to the R, G, and B picture elements cannot be controlled independently, so all the selective picture elements are given the same voltage, $V_{rms}$ "on". In the same way, all of the non-selective picture elements are given the same voltage, $V_{rms}$ "off".

When this kind of conventional matrix-type liquid-crystal display device is driven by the optimum voltage mean method with N frequency, the effective voltage $V_{rms}$ "on" of the selective picture elements and the effective voltage $V_{rms}$ "off" of the non-selective picture elements have a ratio $\alpha$ represented by the equation:

$$\alpha = \frac{V_{rms}(on)}{V_{rms}(off)} = \sqrt{\frac{\sqrt{N}+1}{\sqrt{N}-1}}$$

In this equation, when N approaches infinity (i.e., $N \to \infty$), $\alpha$ approaches 1 (i.e., $\alpha \to 1$). Therefore, as the frequency N increases, the difference between $V_{rms}$ "off" and $V_{rms}$ "on" decreases. Thus, for the manufacture of a liquid-crystal display device of the matrix type with a large capacity for display information, sharp threshold characteristics are needed so that a color display quality that is preferred can be obtained even with a small voltage difference between $V_{rms}$ "on" and $V_{rms}$ "off". In particular, in recent years, in the field of liquid-crystal display devices, with the increase in display information, there has been a stronger demand for increased capacity for display information. However, with this kind of conventional TN-LCD, it has not been possible to increase the frequency, N, sufficiently, which causes difficulties in the applications of such a conventional TN-LCD to color liquid-crystal televisions.

Figure 3:
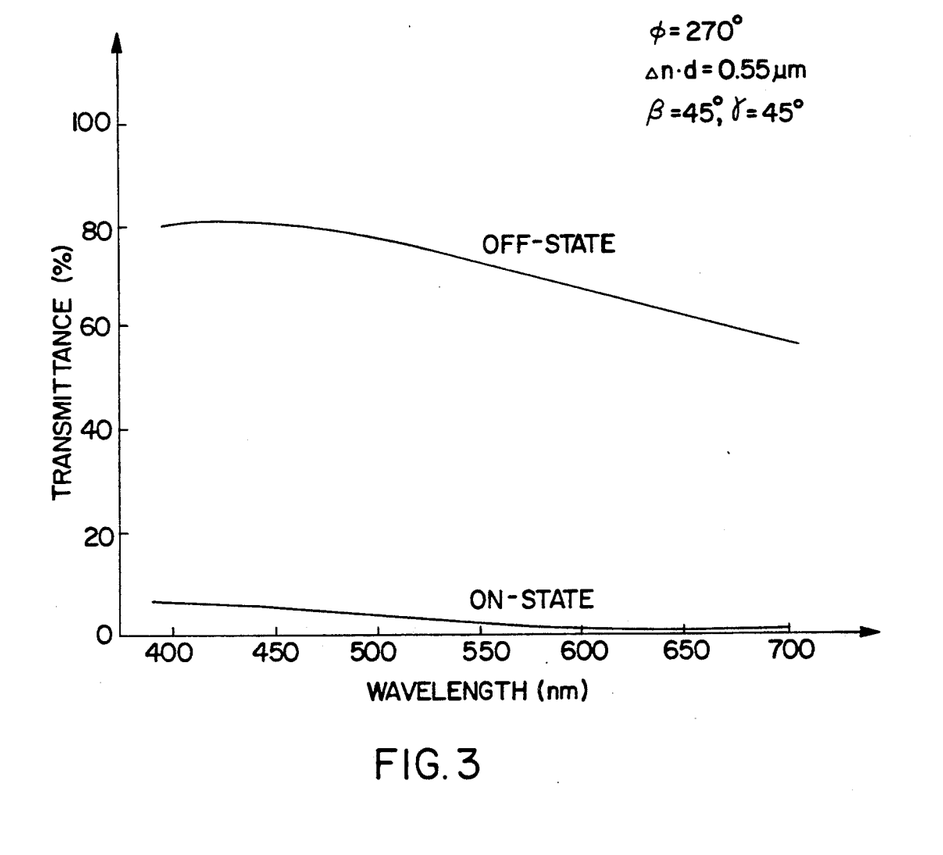
FIG. 3 is of characteristic curves showing the dependence of the transmittance on the wavelength of the colored liquid-crystal display device of this invention.
Figure 8:
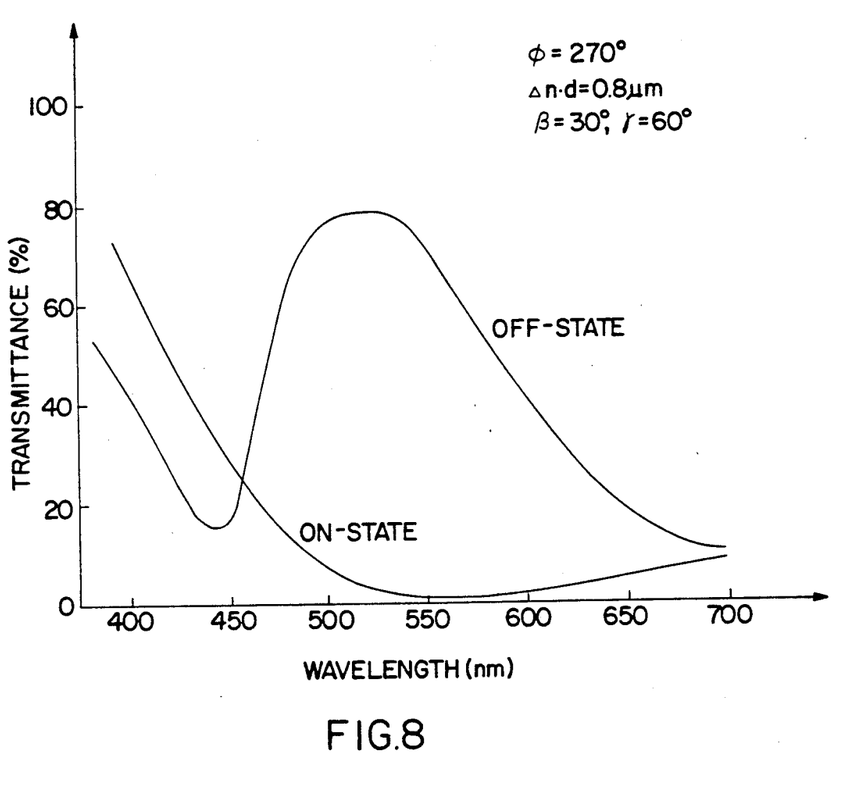
FIG. 8 is of characteristic curves showing the dependence of the transmittance on the wavelength that is typical with regard to the yellow display mode.

A liquid-crystal cell (without a color filter) that has an angle of twist $\phi$ of the liquid-crystal molecule of greater than 90° has been known as a LCD of the supertwisted birefringence effect (SBE) type (T. J. Scheffer and J. Nehring, Appl. Phys. Lett. 45 1021 (1984). The feature of SBE-type LCDs is the skillful application of birefringence effects of liquid crystals to increase the threshold characteristics based on the relationship between the applied voltage and the permeation (below, abbreviated "threshold characteristics"), and according to the display colors, there are yellow and blue display modes. FIG. 8 shows the dependence (yellow mode) of the transmittance on the wavelength of the SBE-type LCD in which phenylcyclohexane (PCH) derivatives are used as a positive dielectric anisotropy nematic liquid crystal, the angle of twist $\phi$ of which is 270°, and for which a layer thickness d of the liquid-crystal and a refraction index anisotropy $\Delta n$ giving a product $\Delta n \cdot d$ are set at 0.8 µm. It is seen from FIG. 8 that the transmittance changes greatly with changes in wavelength. In this way, the threshold characteristics are much increased, but the transmittance characteristics are highly dependent on the wavelength of incident light because of birefringence effects. In view of these facts, the inventors of this invention investigated the effect of the color display characteristics on $\Delta n \cdot d$ as parameters from the viewpoint of color display, and also investigated the practical limits of these parameters. That is, in order to obtain satisfactory color display characteristics, in addition to making the threshold characteristics suitable, it is necessary that the transmittance characteristics do not depend upon the wavelength. The inventors of this invention therefore studied the use of PCH derivatives for a positive dielectric anisotropy nematic liquid crystal for the conditions where the transmittance characteristics do not depend upon changes in wavelength, and found that in the yellow mode display, when the upper limit of $\Delta n \cdot d$ is set smaller than 0.8 μm, the transmittance characteristics become independent of wavelength, so it is possible to obtain satisfactory color display characteristics. FIG. 3 shows the dependence of the transmittance on the wavelength in the case where $\Delta n \cdot d = 0.55$ μm, indicating that the transmittance characteristics have almost no relation to the wavelength. Moreover, the inventors found that when the lower limit of $\Delta n \cdot d$ becomes extremely small, light cannot be propagated along the direction of twist of the liquid-crystal molecules, and accordingly the function as light shutter elements is damaged. The same results as mentioned above are obtainable even when liquid crystals made of materials other than PCH derivatives are used.

SUMMARY OF THE INVENTION

The colored liquid-crystal display device of this invention, which overcomes the above-discussed and numerous other disadvantages and deficiencies of the prior art, comprises a positive dielectric anisotropy nematic liquid-crystal layer with the dielectric constant anisotropy, said liquid-crystal layer having an optically active substance; a pair of electrode substrates facing each other and sandwiching therebetween the positive dielectric anisotropy nematic liquid-crystal layer in such a manner that the positive dielectric anisotropy nematic liquid-crystal is formed into a twisted structure with a fixed angle of twist of the liquid-crystal molecules, $\phi$, of said positive dielectric anisotropy nematic liquid-crystal layer in the direction of a thickness d of said positive dielectric anisotropy nematic liquid-crystal layer; and a polarizer and an analyzer positioned outside of the pair of electrode substrates, respectively, wherein said twist angle $\phi$ is set to be in the range of 180° to 300° and the product of the refractivity anisotropy $\Delta n$ of said positive dielectric anisotropy nematic liquid crystal and the thickness d of said positive dielectric anisotropy nematic liquid crystal, $\Delta n \cdot d$, is set to be in the range of 0.3 μm to 0.7 μm.

In a preferred embodiment, when the angle at which the direction of the polarizing axis of said polarizer and the direction of the long axis of the liquid-crystal molecules on the polarizer-sided electrode substrate cross is $\beta$ and the angle at which the direction of the polarizing axis of said analyzer and the direction of the long axis of the liquid-crystal molecules on the analyzer-sided electrode substrate cross is $\gamma$, and when the angles $\beta$ and $\gamma$ are defined to be positive in the direction of twist of the liquid-crystal molecules from the polarizer-sided electrode substrate to the analyzer-sided electrode substrate, the values for $\beta$ and $\gamma$ are set to be $30° \leq \beta \leq 70°$ and $25° \leq \gamma \leq 65°$, or $-60° \leq \beta \leq -20°$ and $-65° \leq \gamma \leq -25°$, whereby the transmittance of the positive dielectric anisotropy nematic liquid crystal does not depend upon the wavelength of light. The value for $\phi$ is preferably set to be in the range of 210° to 300°, so that a decrease in contrast due to the dispersion of light can be prevented.

In a preferred embodiment, the positive dielectric anisotropy nematic liquid-crystal layer is made of phenylcyclohexane derivatives, biphenyl derivatives, ester derivatives, or pyrimidine derivatives.

Thus, the invention described herein makes possible the objectives of (1) providing a colored liquid-crystal display device with an improved color display quality; (2) providing a colored liquid-crystal display device that produces a colored display image with superior color reproducibility and high contrast; and (3) providing a colored liquid-crystal device that can expand the amount of display information and is applicable not only to color graphic displays and character displays but also to colored liquid-crystal televisions.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

This invention provides a colored liquid-crystal device in which, to a liquid crystal, an optically active substance that causes the liquid-crystal molecules to give rise to a twisted structure is added so that the angle $\phi$ of twist of the liquid-crystal molecules can be set to be more than 90°, and moreover the product $\Delta n \cdot d$ of the refractive index anisotropy $\Delta n$ of the liquid crystal and the layer thickness d of the liquid-crystal is set to be in the range of 0.3 μm to 0.7 μm so that a sharp threshold characteristic curve in the applied voltage-transmittance relationship can be obtained, thereby attaining an improvement of the color display quality and an expansion of the amount of display information.

EXAMPLE 1

Figure 1:
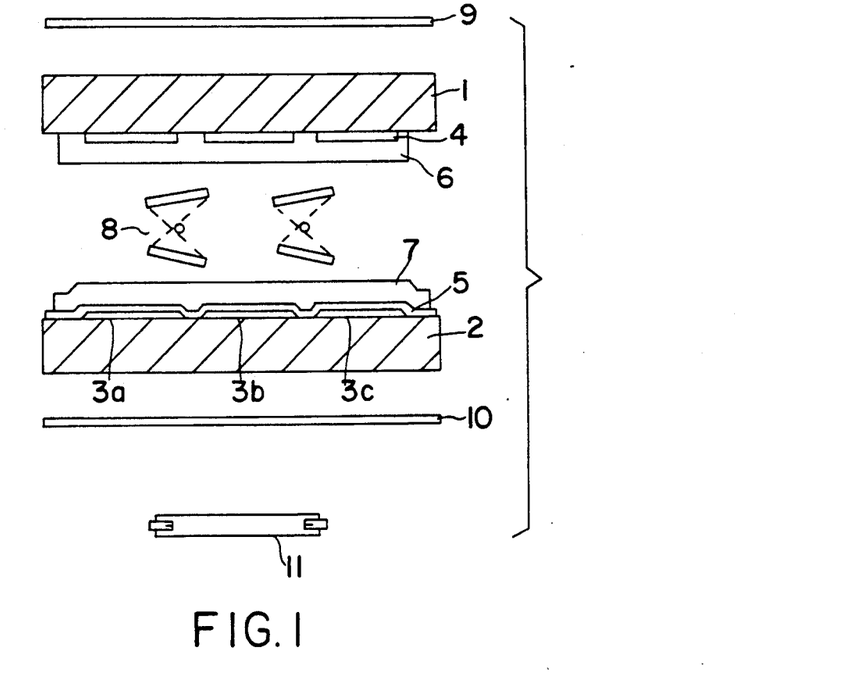
FIG. 1 is a sectional view showing a twisted positive dielectric anisotropy nematic-type colored liquid-crystal device of this invention.

FIG. 1 is a colored liquid-crystal cell of this invention, in which color filter layers 3a-3c are regularly disposed on a bottom glass substrate 2. These colored filter layers 3a-3c are colored red (R), green (G), and blue (B), and have peaks of transmittance in the vicinity of the wavelengths 450, 550, and 650 nm. Transparent electrodes 4 and 5 made of indium oxide are formed in patterns on the undersurface of an upper glass substrate 1 and on the upper surface of the bottom glass substrate 2 with the color filters 3a-3c, respectively. On the surfaces of the electrodes 4 and 5, oriented films 6 and 7 made of a polymer film of polyimidsilane derivatives are formed, respectively, the surfaces of which are treated by being rubbed with cloth in a uniform direction resulting in a colored liquid-crystal cell.

Thereafter, a liquid-crystal layer 8 is placed between the oriented films 6 and 7. An upper polarizer 9 and a lower polarizer 10 are placed behind the upper glass substrate 1 and the bottom glass substrate 2, respectively, resulting in a liquid-crystal display device. Reference numeral 11 is the light source positioned behind the lower polarizer 10.

Figure 2:
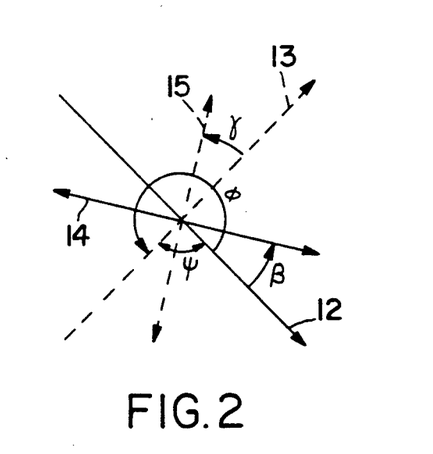
FIG. 2 is a schematic diagram showing the rubbing angle, the twist angle of the liquid-crystal molecules, and the fixed angles of the polarizing plates.

FIG. 2 shows the relationship between the rubbing angle and the angle of twist of the liquid-crystal molecules in the liquid-crystal display device with the structure described above, wherein ψ indicates the angle between the rubbing direction 12 of the upper glass substrate 1 (i.e., the direction of the long axis of the liquid-crystal molecules on the upper glass substrate 1) and the direction opposite to the rubbing direction 13 of the lower glass substrate 2 (i.e., the direction of the long axis of the liquid-crystal molecules on lower glass substrate 2). φ indicates the angle of twist of the liquid-crystal molecules and is adjusted so as to fulfill the requirements of ψ = 360° − φ. The angle of twist φ of the liquid-crystal molecules depends on the ratio d/p, wherein p is the pitch of the twist that arises when optically active substances are added to the positive dielectric anisotropy nematic liquid crystals and d is the thickness of the liquid-crystal layer. The relationship between the angle of twist φ of the liquid-crystal molecules and the ratio d/p is represented by the inequality:

$$(\phi/360° - \tfrac{1}{4}) < d/p < (\phi/360° + \tfrac{1}{4})$$

Arrow 14 indicates the direction of the axis of polarized light from the upper polarizing plate (polarizer) 9, and arrow 15 indicates the direction of the axis of polarized light from the lower polarizing plate (analyzer) 10.

For this liquid-crystal display device, in addition to investigating how to give it good threshold characteristics with the positive dielectric anisotropy nematic liquid crystals of the PCH type, we also investigated the conditions for flattening of the transmittance characteristic curve in the yellow display mode.

The angle of twist φ of the liquid crystals was set at 270°. The thickness d of the liquid-crystal layer was 4.6 μm, and for the oriented film, a polymer film of polyimidsilane derivatives was used. The components of the PCH type liquid crystals used are shown in Table 1.

TABLE 1

| Components | Amount (wt %) |
| --- | --- |
| $C_3H_7$—(H)—(O)—CN | 8.0 |
| $C_5H_{11}$—(H)—(O)—CN | 8.0 |
| $C_3H_7$—(H)—(O)—$OC_2H_5$ | 6.0 |
| $C_3H_7$—(H)—(O)—$OC_4H_9$ | 5.0 |
| $C_3H_7$—(H)—(O)—$C_2H_5$ | 24.0 |
| $C_5H_{11}$—(H)—(O)—(O)—CN | 5.0 |
| $C_5H_{11}$—(H)—(O)—(O)—$C_2H_5$ | 8.0 |
| $C_3H_7$—(H)—(O)—(O)—$C_3H_7$ | 7.0 |
| $C_3H_7$—(H)—(O)—COO—(O)—$C_3H_7$ | 10.0 |
| $C_5H_{11}$—(H)—(O)—COO—(O)—$C_3H_7$ | 7.0 |
| $C_3H_7$—(H)—(H)—(O)—$CH_3$ | 6.0 |
| $C_3H_7$—(H)—(H)—(O)—$C_2H_5$ | 6.0 |

So that the φ of these liquid crystals will be 270°, 1.27 wt % of S-811 (Merck), an optically active substance, is added. The d/p at this time is about 0.65. The refractive index anisotropy Δn of the positive dielectric anisotropy nematic liquid crystals shown in Table 1 is 0.12, so Δn·d = 0.55 μm. The polarizing plates are set so that the fixed angles will be β = 45° and γ = 45°. As a result, as shown in FIG. 3, the permeation characteristic curve is sufficiently flattened with respect to the wavelength. Thus, it is possible to obtain color display characteristics that are satisfactory when the parameters of the yellow display mode, Δn·d, are small. However, if the lower limit of Δn·d is exceedingly small, then light cannot be propagated along the direction of twist of the liquid crystals, and the light shutter function may be damaged. For this reason, the practical limits for Δn·d are preferably set to be in the range of 0.3 μm to 0.7 μm (i.e., 0.3 μm ≤ Δn·d ≤ 0.7 μm), in order to obtain good colored display characteristics. When liquid crystals other than those of the PCH type were used, the same results as above were obtained.

Next, the effects of the set angles β and γ of the polarizing plates on the color display characteristics were investigated. The parameters β and γ are defined to be positive in the direction of twist of the liquid crystal molecules from the upper glass substrate 1 to the lower glass substrate 2.

Figure 4:
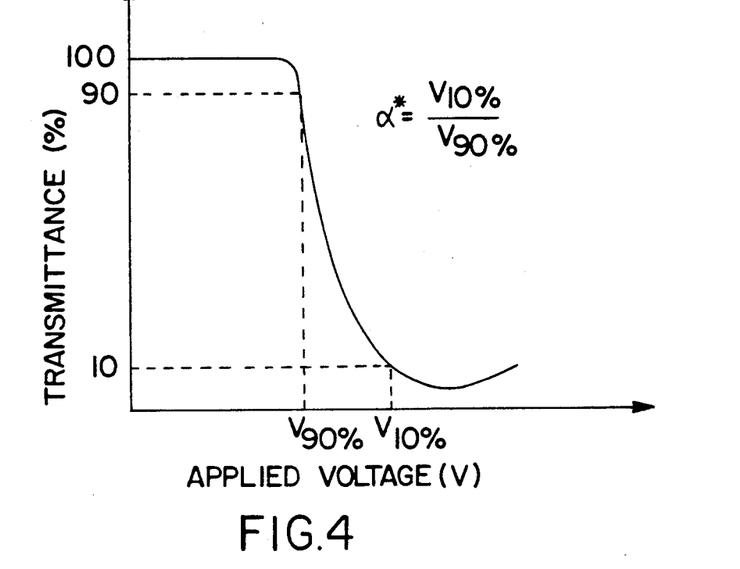
FIG. 4 is a characteristic curve showing the relationship between the applied voltage and the transmittance of the colored liquid-crystal display device of this invention.

First, parameter $\alpha^*$, which indicates the degree of sharpness of the threshold characteristic curve in the applied voltage-transmittance relationship, will be introduced. $\alpha^*$, as shown in FIG. 4, is defined as the ratio of the voltage at which transmittance is 10%, $V_{10\%}$, to the voltage at which the transmittance is 90%, $V_{90\%}$ in this example in which the voltage-transmittance relationship has been visually corrected. That is, $\alpha^* = V_{10\%}/V_{90\%}$. As this $\alpha^*$ approaches 1, the threshold characteristics improve, and thus the color display characteristics become better. With the liquid crystals of the PCH type mentioned above, when $\Delta n \cdot d$ was set at 0.55 $\mu$m, the dependence of $\alpha^*$ on $\beta$ and $\gamma$ was so that $\alpha^*$ was smallest when either $\beta = 45°$ and $\gamma = 45°$ or when $\beta = -45°$ and $\gamma = -45°$. The inventors of this invention studied the case where the values for parameters $\beta$ and $\gamma$ are independently varied around a fixed value, and found that when the change width was not great, the value for $\alpha^*$ did not depend on the values for $\beta$ and $\gamma$, but depended rather on the difference between $\beta$ and $\gamma$. These studies were described in "Abstracts of the 12th Symposium on Liquid Crystals, 3-F12(1986)". The results mentioned above give the optimal values of $\beta$ and $\gamma$.

Figure 5:
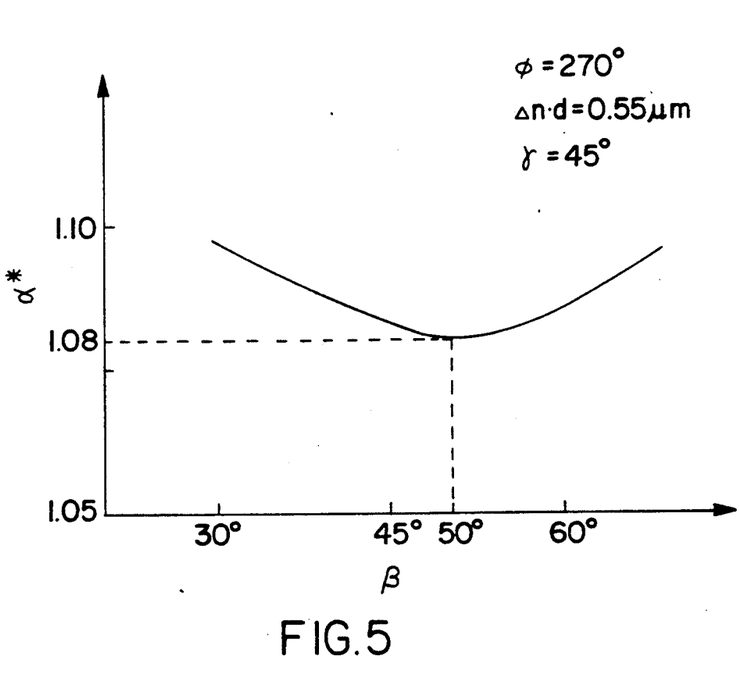
FIG. 5 is a characteristic curve showing the dependence of parameter $\alpha^*$, which indicates the degree of sharpness of the threshold characteristic curve in the applied voltage-transmittance relationship, on the angle $\beta$ of the polarizing axis.

FIG. 5 shows the dependence of $\alpha^*$ on $\beta$ in the case where the value for $\beta$ is varied around the value of 45° when the value for $\gamma$ is set at 45°. From FIG. 5, it can be seen that when $\beta = 50°$, the value of $\alpha^*$ is smallest, at 1.08. In light of the value of $\alpha^*$, the practical limits for $\beta$ and $\gamma$ are preferably set at $\beta = 50° \pm 20°$ and $\gamma = 45° \pm 20°$. Or, when $\gamma$ is set at $-45°$, the value for $\beta$ is optimum at $-40°$, and in that case, $\alpha^* = 1.08$. In this case, the practical limits for $\beta$ and $\gamma$ are $\beta = -40° \pm 20°$ and $\gamma = -45° \pm 20°$.

Figure 6:
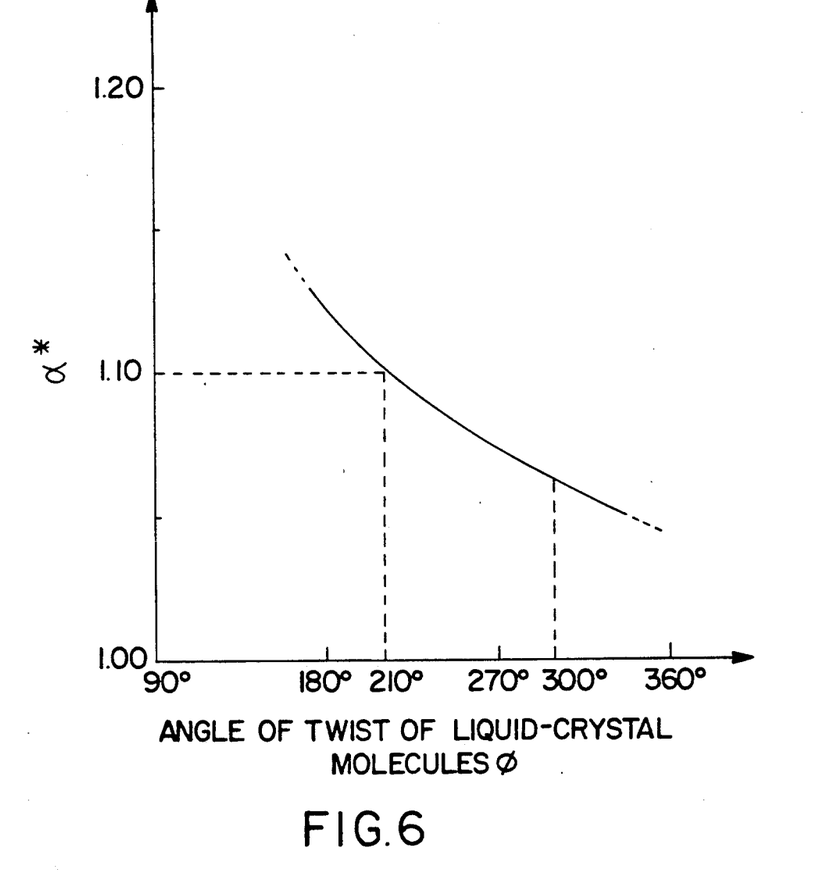
FIG. 6 is a characteristic curve showing the dependence of the value for $\alpha^*$ on the angle $\phi$ of twist of the liquid-crystal molecules.

As seen in FIG. 6, which shows the dependence of $\alpha^*$ on $\phi$, when the angle of twist of the liquid crystals, $\phi$, increases, $\alpha^*$ becomes smaller. However, when $\phi$ becomes large, a domain appears in which the liquid crystals have their orientation disarrayed at the time of the application of voltage, resulting in a dispersion of light, which readily gives rise to a decrease in contrast. For this reason, as practical limits for $\phi$, $210° \leq \phi \leq 300°$ are preferable. The results given above are the same for the limits of $\Delta n \cdot d$ of 0.3 $\mu m \leq \Delta n \cdot d \leq 0.7$ $\mu$m, and when liquid crystals other than the PCH type are used, the results are the same. It was found that no problems occurred in practice when the values of $\beta$ and $\gamma$ were set within the limits given above with regard to the dependence of the transmittance characteristics on the wavelength. For comparison, the liquid crystals of the PCH type mentioned above were used in a conventional color display TN-LCD, with $\Delta n \cdot d = 0.55$ $\mu$m, $\alpha^*$ was measured and found to be 1.48.

In this way, the threshold characteristics of the color display TN-LCD of this invention were strikingly improved, and the color display characteristics were improved. The color display TN-LCD of this invention in comparison to the conventional color display TN-LCD exhibited excellent color display characteristics with wide limits for the visibility angle.

EXAMPLE 2

Here, the structure of the liquid crystal cell was the same as that shown in FIG. 1. The angle of twist of the liquid-crystal molecules, $\phi$, was 270°. The thickness d of the liquid crystal layer was 4.5 $\mu$m, and the oriented film was a polymer film of polyimidsilane derivatives. The components of the positive dielectric anisotropy nematic liquid crystals used are shown in Table 2.

TABLE 2

| Components | Amount |
|---|---|
| $C_3H_7$—(H)—(O)—CN | 12% |
| $C_4H_9$—(H)—(O)—CN | 10% |
| $C_5H_{11}$—(H)—(O)—CN | 10% |
| $C_3H_7$—(O)—COO—(O)(F)—CN | 6% |
| $C_4H_9$—(O)—COO—(O)(F)—CN | 6% |
| $C_5H_{11}$—(O)—COO—(O)(F)—CN | 6% |
| $C_3H_7$—(H)—(O)—COO—(O)(F)—CN | 7.5% |
| $C_4H_9$—(H)—(O)—COO—(O)(F)—CN | 7.5% |
| $C_3H_7$—(H)—(O)—OC$_2$H$_5$ | 10% |
| $C_3H_7$—(H)—(O)—OC$_4$H$_9$ | 10% |
| $C_3H_7$—(H)—(O)—(O)—C$_2$H$_5$ | 5% |
| $C_5H_{11}$—(H)—(O)—(O)—C$_2$H$_5$ | 5% |
| $C_3H_7$—(H)—(O)—(O)—(H)—C$_3$H$_7$ | 2.5% |
| $C_5H_{11}$—(H)—(O)—(O)—(H)—C$_3$H$_7$ | 2.5% |

To these positive dielectric anisotropy nematic liquid crystals, 1.30 wt % of S-811 (Merck), an optically active substance, was added so that the angle of twist of the liquid crystal molecules, $\phi$, would be 270°. The helix pitch p of the liquid crystals at this time was 6.9 $\mu$m, and the ratio d/p became close to 0.65. The refractive index anisotropy $\Delta n$ of the positive dielectric anisotropy nematic liquid crystals shown in Table 2 was 0.13, so $\Delta n \cdot d$ was 0.59 μm. The set angles $\beta$ and $\gamma$ of the polarizing plates were set at $\beta=50°$ and $\gamma=45°$.

The value of $\alpha^*$ of the liquid crystal cell of this kind of structure was measured. It was 1.07, with which it was possible to attain good color display characteristics having wide limits for the angle of visibility.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A colored liquid-crystal display device comprising a positive dielectric anisotropy nematic liquid-crystal layer with the dielectric constant anisotropy, said liquid-crystal layer having:

an optically active substance;

a pair of electrode substrates facing each other and sandwiching therebetween the positive dielectric anisotropy nematic liquid-crystal layer in such a manner that the positive dielectric anisotropy nematic liquid crystal is formed into a twisted structure with a fixed angle of twist of the liquid-crystal molecules, $\phi$, of said positive dielectric anisotropy nematic liquid-crystal layer in the direction of a thickness d of said positive dielectric anisotropy nematic liquid-crystal layer;

a polarizer and an analyzer positioned outside of the pair of electrode substrates, respectively, said polarizer being set with an angle $\beta$ at which the direction of the polarizing axis of said polarizer and the direction of the long axis of the liquid-crystal molecules on the polarizer-sided electrode substrate cross, said analyzer being set with an angle $\gamma$ at which the direction of the polarizing axis of said analyzer and the direction of the long axis of the liquid-crystal molecules on the analyzer-sided electrode substrate cross, and the angles $\beta$ and $\gamma$ being defined to be positive in the direction of twist of the liquid-crystal molecules from the polarizer-sided electrode substrate to the analyzer-sided electrode substrate;

a pair of oriented films positioned between the positive dielectric anisotropy nematic liquid-crystal layer and the electrode substrates;

three color filter layers positioned on one of said pair of electrode substrates between said polarizer and said analyzer, wherein said twist angle $\phi$ is set to be in the range of 180° to 300°, the product of the refractivity anisotropy $\Delta n$ of said positive dielectric anisotropy nematic liquid-crystal and the thickness d of said positive dielectric anisotropy nematic liquid-crystal, $\Delta n \cdot d$, is set to be in the range of 0.3 μm to 0.59 μm and the values for $\beta$ and $\gamma$ are set to be $30° \leq \beta \leq 70°$ and $25° \leq \gamma \leq 65°$, or $-60° \leq \beta \leq -20°$ and $-65° \leq \gamma \leq -25°$.

2. A colored liquid-crystal display device according to claim 1, wherein said positive dielectric anisotropy nematic liquid-crystal layer is made of phenylcyclohexane derivatives, biphenyl derivatives, ester derivatives or pyrimidine derivatives.

3. A colored liquid-crystal display device according to claim 1, wherein said three color filter layers are of red, green, and blue, respectively.

* * * * *